(12) United States Patent
Uno et al.

(10) Patent No.: US 8,019,210 B2
(45) Date of Patent: Sep. 13, 2011

(54) IMAGE STABILIZING UNIT, LENS UNIT, AND IMAGING APPARATUS, HAVING TWO DRIVE UNITS AT AN INCLINED ANGLE TO ONE ANOTHER FOR DRIVING AN IMAGING DEVICE A DIRECTION PERPENDICULAR TO THE OPTICAL AXIS

(75) Inventors: Tetsuya Uno, Tondabayashi (JP); Hiroshi Mashima, Tokyo (JP); Tsutomu Honda, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 908 days.

(21) Appl. No.: 11/787,349

(22) Filed: Apr. 16, 2007

(65) Prior Publication Data
US 2007/0242938 A1    Oct. 18, 2007

(30) Foreign Application Priority Data
Apr. 17, 2006  (JP) .................. 2006-113024

(51) Int. Cl.
*G03B 17/00* (2006.01)
(52) U.S. Cl. .................. 396/55; 348/208.99; 348/208.5; 348/208.11; 359/557
(58) Field of Classification Search .................. 396/55; 348/208.99, 208.4, 208.5, 208.7, 208.11; 359/557
See application file for complete search history.

(56) References Cited

U.S. PATENT DOCUMENTS

| | | | | |
|---|---|---|---|---|
| 3,756,687 A * | 9/1973 | Shin et al. | ...................... | 359/557 |
| 5,416,557 A * | 5/1995 | Nagasaki et al. | ................ | 396/52 |
| 5,678,069 A * | 10/1997 | Hirano et al. | .................... | 396/55 |
| 5,731,896 A * | 3/1998 | Baumann et al. | ............. | 359/557 |
| 5,745,800 A * | 4/1998 | Kanbara et al. | .................. | 396/55 |
| 5,786,936 A * | 7/1998 | Baumann et al. | ............. | 359/557 |
| 5,852,749 A * | 12/1998 | Konno et al. | .................... | 396/55 |
| 5,926,656 A * | 7/1999 | Imura et al. | ...................... | 396/55 |
| 6,308,010 B1 * | 10/2001 | Sasaki et al. | ..................... | 396/52 |
| 6,397,008 B2 * | 5/2002 | Kuwana et al. | .................. | 396/55 |
| 6,701,071 B2 * | 3/2004 | Wada et al. | ...................... | 396/55 |

(Continued)

FOREIGN PATENT DOCUMENTS

JP    2003-111449    4/2003

(Continued)

OTHER PUBLICATIONS

Machine English Translation, JP 2003-111449, Wada et al., Nov. 4, 2003, 16 pages.*

(Continued)

*Primary Examiner* — W. B. Perkey
*Assistant Examiner* — Bret Adams
(74) *Attorney, Agent, or Firm* — Brinks Hofer Gilson & Lione

(57) ABSTRACT

There is provided an image stabilizing unit 1 small in size in one direction perpendicular to an optical axis, including, on a base member 2, a movable compensation member 5 which can displace an image forming position by moving in a plane perpendicular to an optical axis Z, and two drive units 6, 7 for displacing the movable compensation member 5 in the directions of R and S which are different from each other for 90 degrees, wherein the directions in which the drive units 6, 7 respectively move the movable compensation member 5 are inclined 45 degrees to a direction X which connects the drive units 6, 7 and the optical axis center Z of the movable compensation member 5.

36 Claims, 7 Drawing Sheets

U.S. PATENT DOCUMENTS

| | | | |
|---|---|---|---|
| 7,298,564 B2 * | 11/2007 | Rouvinen et al. | 359/824 |
| 7,389,040 B2 * | 6/2008 | Nomura | 396/75 |
| 7,440,688 B2 * | 10/2008 | Uehara et al. | 396/55 |
| 7,593,628 B2 * | 9/2009 | Ito et al. | 396/55 |
| 7,701,486 B2 * | 4/2010 | Kosaka et al. | 348/208.7 |
| 2002/0112543 A1 * | 8/2002 | Noguchi | 73/618 |
| 2004/0013079 A1 * | 1/2004 | Suzuki et al. | 369/244 |
| 2006/0177208 A1 * | 8/2006 | Ito et al. | 396/55 |
| 2006/0257129 A1 * | 11/2006 | Shibatani | 396/55 |
| 2007/0133092 A1 * | 6/2007 | Maeda et al. | 359/557 |

FOREIGN PATENT DOCUMENTS

| | | |
|---|---|---|
| JP | 2004-54180 A | 2/2004 |
| JP | 2005-217928 A | 8/2005 |
| JP | 2006-065352 | 3/2006 |

OTHER PUBLICATIONS

Machine English Translation, JP 2006-0653352, Hayashi et al. Sep. 3, 2006, 15 pages.*

* cited by examiner

IMAGE STABILIZING UNIT, LENS UNIT, AND IMAGING APPARATUS, HAVING TWO DRIVE UNITS AT AN INCLINED ANGLE TO ONE ANOTHER FOR DRIVING AN IMAGING DEVICE A DIRECTION PERPENDICULAR TO THE OPTICAL AXIS

RELATED APPLICATION

This application is based on applications No. JP2006-113024 filed in Japan, the contents of which are hereby incorporated by reference.

BACKGROUND OF THE INVENTION

The present invention relates to an image stabilizing unit, a lens unit having an image stabilizing function, and an imaging apparatus.

Publicly known imaging apparatuses include one having an image stabilizing unit in which a lens or an imaging device is moved in a plane perpendicular to an optical axis as a movable compensation member in order to compensate an image vibrations. In JP 2006-65352 A, the image stabilizing unit which moves a lens is described, and in JP 2003-111449 A, the image stabilizing unit which moves an imaging device is described.

In these conventional image stabilizing units, two drive units and two guiding shafts (when drive units are linear actuators, they can also be used as the axis of the drive units) are placed so that an angle of 90 degrees may be made from the optical axis center of a movable compensation member. The driving force of the drive unit acts toward the optical axis center of the movable compensation member or in the direction of 90 degrees with respect to the optical axis center. The guiding shafts are placed in parallel with these respective drive directions.

Publicly known lens units include one in the bent optical system which bends the luminous flux from a subject 90 degrees to reduce the thickness in the subject direction. However, when the conventional image stabilizing unit was adopted for the lens unit in the bent optical system, the thickness of the lens unit became large, which spoiled the advantage of the bent optical system, that is, the thickness can be reduced in the subject direction.

In the case of using a lens unit of the type which does not bend the luminous flux, the conventional image stabilizing unit was not able to meet the needs of structuring a thin imaging apparatus in which an area facing a subject is decreased.

SUMMARY OF THE INVENTION

In view of the above problem, an object of the present invention is to provide an image stabilizing unit smaller in size in one direction perpendicular to an optical axis, a thin lens unit having an image stabilizing function and having a size smaller in one direction perpendicular to an optical axis, and a thin imaging apparatus.

In order to achieve the above objects, there is provided an image stabilizing unit in a first aspect of the present invention, including, on a base member, a movable compensation member which can displace an image forming position by moving in a plane perpendicular to an optical axis, and two drive units which respectively move the movable compensation member in different directions, wherein the directions in which the drive units respectively move the movable compensation member are inclined to a direction which connects the drive units and an optical axis center of the movable compensation member.

According to this structure, the drive units are placed inclined to the movable compensation member, and therefore, the position of the drive units around the optical axis can be chosen regardless of the drive direction. Consequently, two drive units and the movable compensation member can be aligned, so that a base member can be made flat, and thereby an image stabilizing unit which is small in size in one direction perpendicular to an optical axis can be structured.

In the image stabilizing unit in this aspect, the directions in which the drive units respectively move the movable compensation member may be inclined approximately 45 degrees with respect to a direction which connects the drive units and an optical axis center of the movable compensation member.

According to this structure, when two drive units and the movable compensation members are aligned, the drive directions of two drive units are inclined 45 degrees to different sides across the optical axis so that it becomes possible to drive orthogonal coordinate systems having drive directions different from each other for 90 degrees.

In the image stabilizing unit in this aspect, the drive units may be placed on both sides of the movable compensation member across the optical axis.

According to this structure, sufficient drive balance is obtained by placing the drive units adjacent to the movable compensation member.

Also, there is provided an image stabilizing unit in a second aspect of the present invention, including, on a base member, a movable compensation member which is supported movably in a plane perpendicular to an optical axis along two guiding shafts and which can displace an image forming position by moving, and two drive units which respectively move the movable compensation member along either of the guiding shafts, wherein the base member takes a flat shape in which a long side is twice as large as a shorter side in a direction perpendicular to the optical axis, and wherein the two guiding shafts and the two drive units are respectively placed on both sides of the movable compensation member in a long side direction of the base member.

According to this structure, by placing the guiding shafts and the drive units on both sides of the movable compensation member, two drive units are placed in the long side direction of the base member, by which the shorter side can be shortened to half the size of the long side or smaller.

In the image stabilizing unit in this aspect, the guiding shafts may be inclined approximately 45 degree to the long side direction of the base member.

According to this structure, two guiding shafts different in direction from each other for 90 degrees can be placed so that the occupied length in the shorter side direction of the base member can be minimized, while driving force acts upon the movable compensation member in a balanced manner, so that stable operation is achieved.

In the image stabilizing unit in the first and the second aspects of the present invention, the two drive units may be placed on a straight line which crosses the optical axis at right angles.

According to this structure, the base member can be flattened to the maximum extent by aligning two drive units in the direction orthogonal to an optical axis.

In the image stabilizing unit in the first and the second aspect of the present invention, the drive units may be composed of an electromechanical transducer expanding and contracting in response to applied voltage, a drive friction member, one end of which is fixed to the electromechanical transducer and which reciprocates by expansion and contraction of the electromechanical transducer, and a movable body which engages with the drive friction member by frictional force.

According to this structure, the image stabilizing unit can be miniaturized by adopting a small piezo-electric actuator as a drive unit. In this case, it is possible to make the drive friction member serve also as a guiding shaft.

In the image stabilizing unit of the first and the second aspect of the present invention, the drive unit may be constituted of a voice coil motor.

According to this structure, the image stabilizing unit can be miniaturized by adopting a voice coil motor as a drive unit.

A lens unit in the present invention includes an optical system which forms an image with luminous flux incident from a subject, an imaging device for receiving the luminous flux with which the optical system formed an image and for converting the formed image into an electrical signal, and the image stabilizing unit of the first or the second aspect.

According to this structure, the size of the lens unit having an image stabilizing function can be reduced in one direction perpendicular to an optical axis.

The lens unit of the present invention may have an optical member which bends luminous flux incident from a subject at an approximately right angle, and may place the image stabilizing unit closer to an image formation side than the optical member.

According to this structure, regardless of the placement of the image stabilizing unit, the thickness of the lens unit in the subject direction can be reduced.

The imaging apparatus in the present invention has any of the aforementioned lens units.

According to this structure, the size of an imaging apparatus having an image stabilizing function can be reduced in one direction perpendicular to an optical axis.

In the imaging apparatus in the present invention having a lens unit composed of an optical member which bends the luminous flux incident from a subject at an approximately right angle, and the image stabilizing unit downstream from the optical member, the direction where the size of the base member is the shortest is congruous with the thickness direction of the imaging apparatus.

According to this structure, the thickness of the imaging apparatus in a subject direction can be reduced.

According to the present invention, the size of an image stabilizing unit can be reduced in one direction perpendicular to an optical axis by placing a movable compensation member and two drive units side by side on a straight line.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
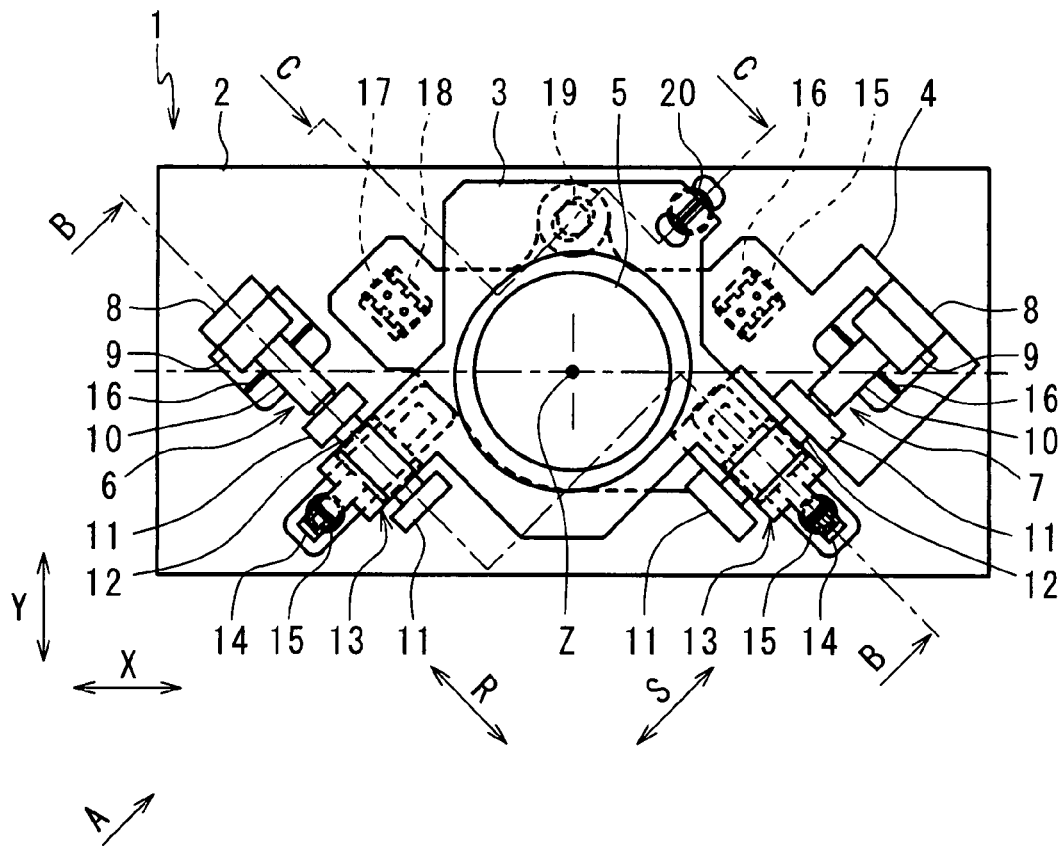
FIG. 1 is a plan view of an image stabilizing unit in a first embodiment of the present invention.

An image stabilizing unit 1 in a first embodiment of the present invention is shown in FIG. 1. The image stabilizing unit 1, which is long in the direction of arrow X, is structured so that a first retainer board 3 is supported on a base member 2 which is short in the direction of arrow Y and is in the shape of a rectangular plate, a second retainer board 4 is further supported by the first retainer board 3, and a compensation lens (movable compensation member) 5 is retained on the second support plate 4. The first retainer board 3 is displaced in the direction of arrow R with respect to the base member 2 by a first drive unit 6, and the second retainer board 4 is displaced in the direction of arrow S with respect to the first retainer board 3 by a second drive unit 7. Accordingly in the image stabilizing unit 1, the compensation lens 5 can be displaced in the direction R and in the direction S.

Figure 2:
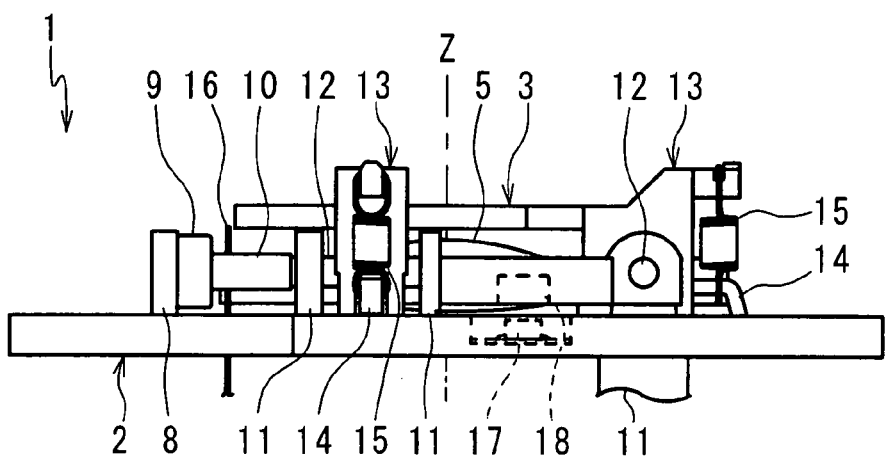
FIG. 2 is a side view of the image stabilizing unit of FIG. 1.
Figure 3:
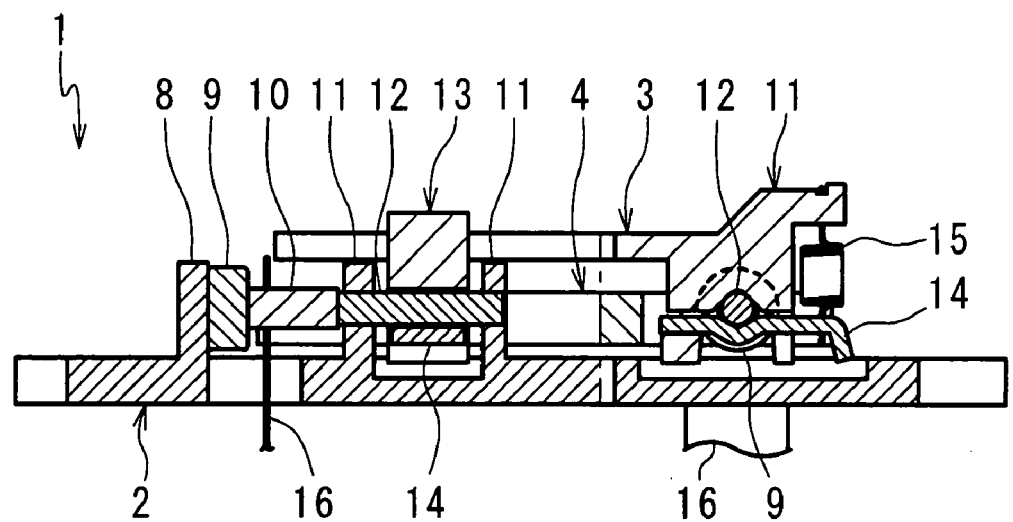
FIG. 3 is a cross sectional view of the image stabilizing unit of FIG. 1.

Further, the side view of the image stabilizing unit 1 seen from arrow A direction in FIG. 1 is shown in FIG. 2, and the cross sectional view of the image stabilizing unit 1 taken along line B-B in FIG. 1 is shown in FIG. 3. The first drive unit 6 is composed of a weight 9 fixed to a fixing section 8 provided on the base member 2, an electromechanical transducer (e.g., piezoelectric element) 10, one end of which is fixed to the weight 9, an axis-like drive friction member 12, one end of which is fixed to the other end of the electromechanical transducer 10 and which is supported slidably in the direction of arrow R by a bearing 11 provided on the base member 2, and a movable body 13 which is formed integrally with the first retainer board 3 in the state of projecting in the direction S from the first retainer board 3 and which has friction engagement with the drive friction member 12. The movable body 13 has a pressing member 14 and a spring 15 in order to hold the drive friction member 12 therebetween. Moreover, a flexible substrate 16 which supplies driver voltage is connected to the electromechanical transducer 10, and the electromechanical transducer 10 is expanded and contracted in response to the applied voltage.

The drive friction member 12 of the first drive unit 6 reciprocates in the direction R by expansion and contraction of the electromechanical transducer 10, by which the movable body 13 is slid to displace the first retainer board 3, while acting also as a guiding shaft for guiding the first retainer board 3 in the direction R. The drive direction to which this first drive unit 6 displaces the first retainer board 3 is the direction R, which makes an angle of 45 degrees with respect to the direction X. That is, the drive direction of the first drive unit 6 is a direction which inclines 45 degrees to the direction which connects an optical axis Z to the first drive unit 6. Consequently, the first drive unit 6 can drive the compensation lens 5 retained upon the second retainer board 4 via the first retainer board 3 in the direction R.

The second drive unit 7 is structured in a similar manner as the first drive unit 6 except the point that its fixing section 8 and its bearing 11 are provided on the second retainer board 4 and that its movable body 13 is formed integrally with the first retainer board 3. Moreover, the second drive unit 7 relatively moves the movable body 13 on the first retainer board 3 along a drive friction member 12 extending in the direction S, so that the second drive unit 7 itself moves in the direction of arrow S together with the second retainer board 4. Here, the drive direction of the second drive unit 7 inclines 45 degrees to the direction X which travels to the optical axis Z, and becomes the direction S which is different for 90 degrees from the drive direction (the direction R) of the first drive unit 6. That is, the second drive unit 7 can drive the compensation lens 5 in the direction S with respect to the first retainer board 3.

As shown in FIG. 1, the first drive unit 6 and the second drive unit 7 are placed symmetrically on both sides of the direction X of the compensation lens 5 across the optical axis Z. That is, the electromechanical transducers 10 which are a driving source of the first drive unit 6 and the second drive unit 7 and which have the center of gravity are placed along with the compensation lens 5 in the direction X on the straight line intersecting the optical axis Z at right angles. Accordingly, the base member 2 has a flat shape in which the length of the long side in the direction X is more than twice the length of the shorter side in the direction Y.

The compensation lens 5 focuses the luminous flux, which comes incident from the front side of the page, on the optical axis Z on the back side of the page to form an image. It functions as a movable compensation member to displace an image forming position in an RS plane in proportion to a displacement amount. Although the position of the compensation lens 5 is given as XY coordinates, the displacement amount of the direction RS is computed by converting the XY coordinates to RS coordinates.

In the image stabilizing unit 1, two hall devices 15 and 17 are embedded in the base member 2, and by detecting the flux change caused by displacement of the magnets 16 and 18, which are fixed onto the second retainer board 4 in the way of facing each of the hall devices 15 and 17, displacement of the second retainer board 4 in the direction R and the direction S is detected. In short, the first drive unit 6 and the second drive unit 7 can receive feedbacks of the drive amount from each of the hall devices 15 and 17 so as to correctly position the compensation lens 5 in the direction R and in the direction S, respectively.

Figure 4:
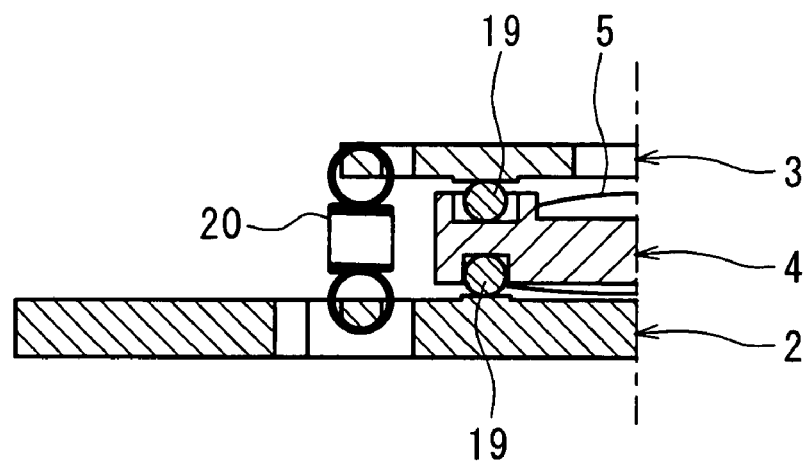
FIG. 4 is another cross sectional view of the image stabilizing units of FIG. 1.

Further, the cross sectional view of the image stabilizing unit 1 taken along line C-C in FIG. 1 is shown in FIG. 4. The image stabilizing unit 1 is structured so that in the position distant from both the drive friction members 12 of the first drive unit 6 and the second drive unit 7, the base member 2 and the second retainer board 4, as well as the second retainer board 4 and the first retainer board 3 come to slide to each other via the bearing balls. Since the first retainer board 3 is pulled toward the base member 2 by a spring 20, the first retainer board 3 and the second retainer board 4 rotate around the drive friction members 12 so as not to lose touch with the base member 2.

In the above-structured image stabilizing unit 1, the first drive unit 6 and the second drive unit 7 are juxtaposed on an approximately straight line in the direction X across the compensation lens 5. Accordingly, the image stabilizing unit 1 does not have any large components placed together with the compensation lens 5 in the direction Y, and therefore can be made into the flat shape which is small in size in the direction Y. In other words, the image stabilizing unit 1 is small in size in one direction perpendicular to the optical axis Z, and therefore can be incorporated in a thin device.

Figure 5:
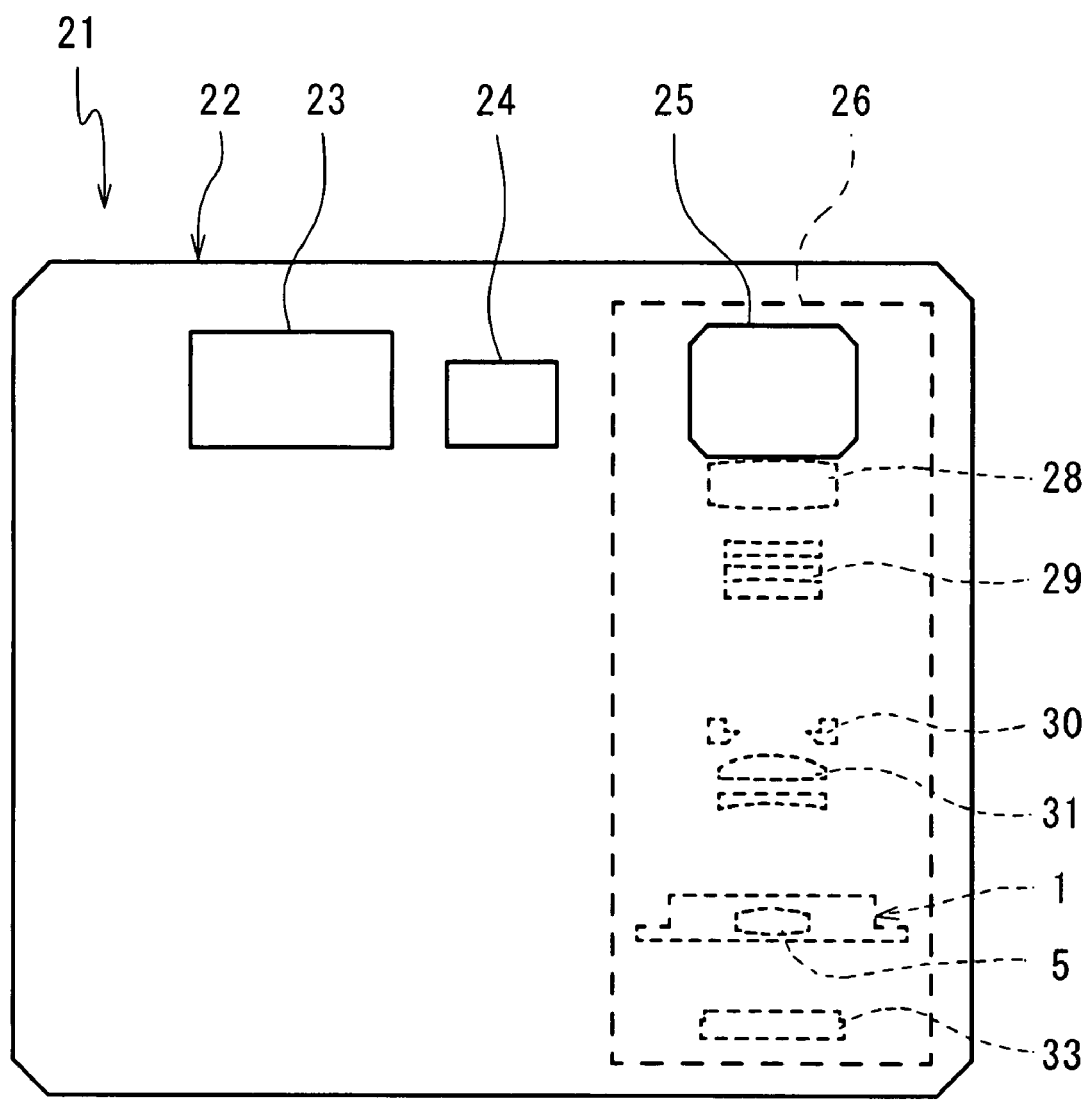
FIG. 5 is a front view of an imaging apparatus having the image stabilizing unit of FIG. 1.

Next, an imaging apparatus (digital camera) 21 incorporating the image stabilizing unit 1 is shown in FIG. 5. An imaging apparatus 21 is equipped with a flash 23, a finder 24, and lens opening 25 in the front of its main body 22, and accommodates a lens unit 26, which faces a subject from the lens opening 25, inside the main body 22. The lens unit 26 has the above-mentioned image stabilizing unit 1. In the imaging apparatus 21, the shorter side direction of the base member 2 (direction Y) in the image stabilizing unit 1 corresponds with the thickness direction (direction facing a subject) of the main body 22.

Figure 6:
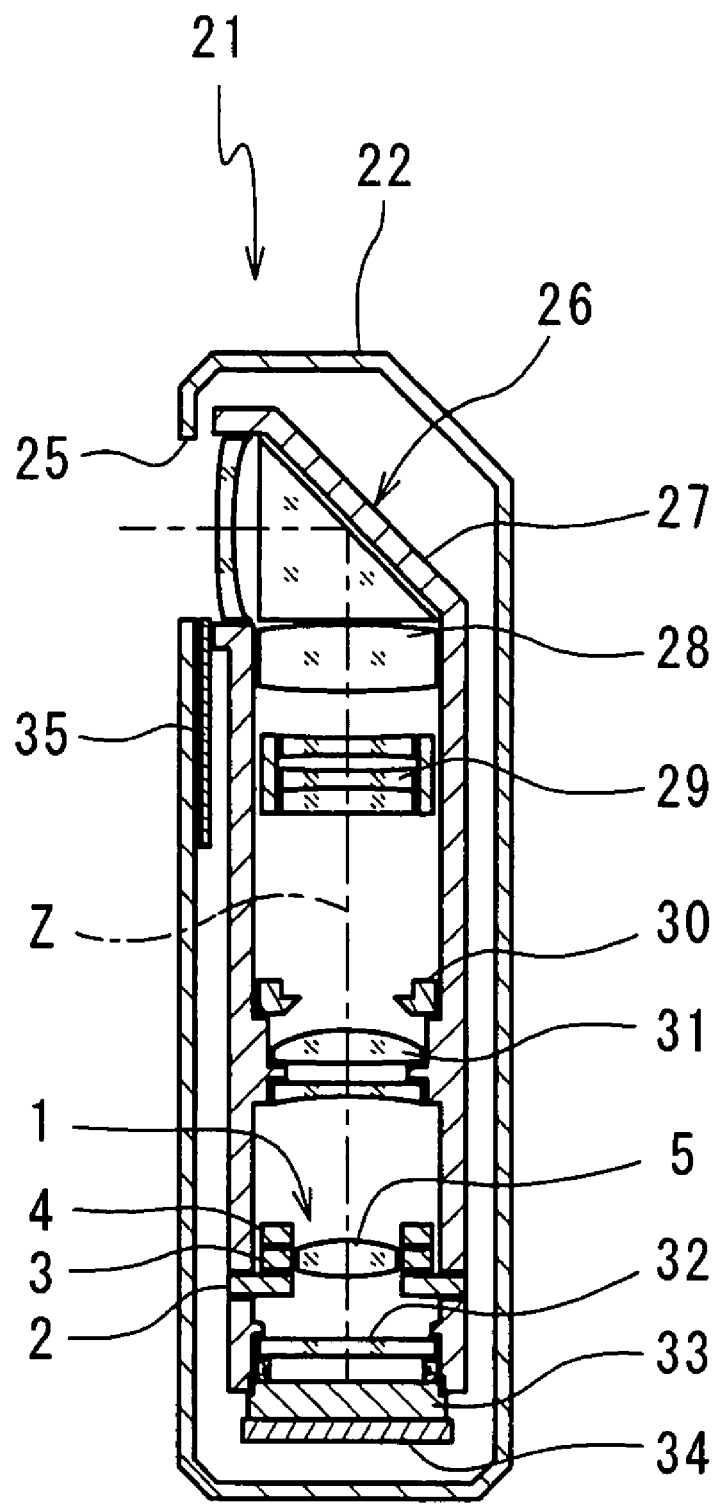
FIG. 6 is a cross sectional view of the imaging apparatus of FIG. 5 on the optical axis.

The cross section of the imaging apparatus 21 is shown in FIG. 6. The lens unit 26 incorporates a bending lens group 28 including an optical member for bending luminous flux, which was incident from a subject via the lens opening 25, for 90 degrees, a zoom lens group 29 which moves up and down along the optical axis Z, a stop member 30 which can narrow an optical path and functions also as a shutter, a fixed intermediate lens group 31, an image stabilizing unit 1 having a compensation lens 5, and an imaging device 33 composed of an optical filter 32 and a CCD, in this order in lens barrel 27. A circuit board 34 is joined to the back of the imaging device 33 located in the lower end of the lens barrel 27. Moreover, the imaging apparatus 1 has a lens barrier 35 which can close the lens opening 25.

The lens unit 26 constitutes a bent optical system for bending the luminous flux which was incident from the subject at right angles by the bending lens group 28. The bent optical system, which forms an image with the luminous flux coming from a subject in the imaging device 33 and converts the image into an electrical signal, can change the size of an image in the imaging apparatus 33 depending on the position of the zoom lens group 29.

Figure 7:
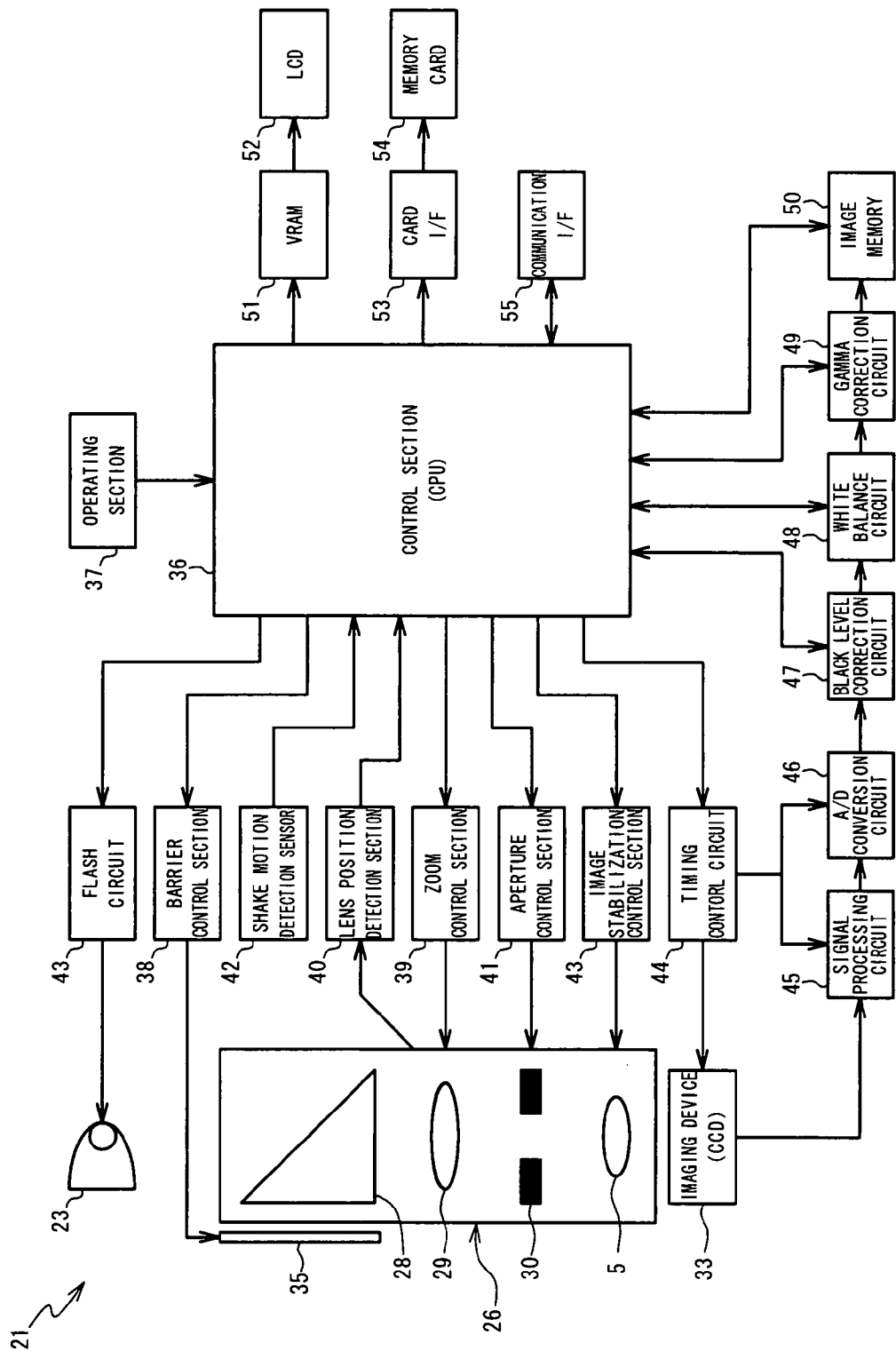
FIG. 7 is a block diagram showing the structure of the imaging apparatus of FIG. 5.

FIG. 7 is a block diagram showing the structure of the imaging apparatus 21. The imaging apparatus 21, which has a control section 36 constituted of a CPU, receives directions of operation from a user via a operating section 37 which is composed of a switch provided on the main body 22. A barrier control section 38 opens and closes the lens barrier 35 where necessity. The control section 36 instructs a zoom control section 39 to move the zoom lens group 29, and positions the zoom lens group 29 upon reception of feedback from a lens position detection section 40. An aperture control section 40 drives the stop member 30 to control an optical path.

Moreover, the imaging apparatus 21 has an shake motion detection sensor 42. An image stabilization control section 43 computes a displacement amount of image formation in the imaging device 33 caused by posture change of the main body 22, and the compensation lens 5 is displaced by the image stabilizing unit 1 so that the displacement of the formed image is offset in the imaging device 33.

The imaging device 33 is timed to directions from a timing control circuit 44 to convert a formed image into an electrical signal and to output it to a signal processing circuit 45. The signal processing circuit 45 generates a picture signal from an output signal of the imaging device 33, and an analog-to-digital conversion circuit 46 converts the picture signal into a digital signal. Further, after a digitized picture signal is processed in a black level correction circuit 47, a WB (white balance) circuit 48, and a gamma correction circuit 49, it is stored temporarily in an image memory 50.

Moreover, the imaging apparatus 21 has a VRAM 51, so that a picture signal can be converted into a video signal and displayed on a LCD (liquid crystal display) 52. Moreover, the imaging apparatus 21 has a card I/F (interface) 53, so that picture signals can be recorded onto a memory card 54 and the picture signals can also be transferred to an external instrument via a communication I/F (interface) 55.

In the imaging apparatus 1 of the above structure, the lens unit 26 has an image stabilizing unit small in size in the direction Y as mentioned above, and therefore its thickness size in the subject direction is small. Consequently, the imaging apparatus 1 can keep its thickness size small.

Figure 8:
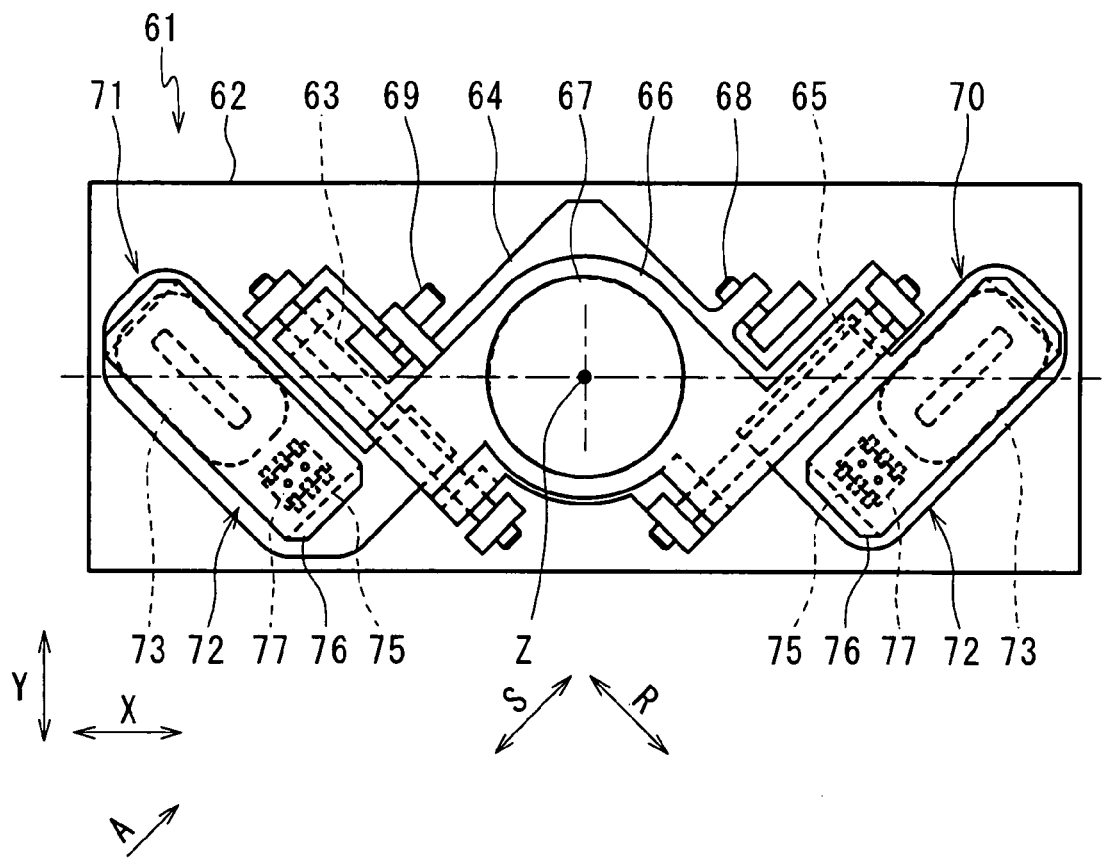
FIG. 8 is a plan view of an image stabilizing unit in a second embodiment of the present invention.
Figure 9:
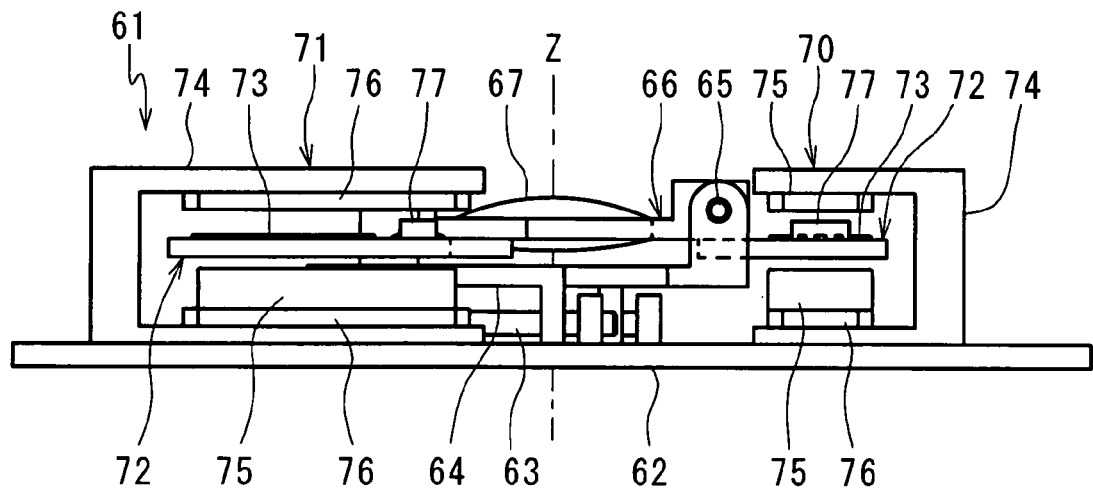
FIG. 9 is a side view of the image stabilizing unit of FIG. 8.

Further, an image stabilizing unit 61 in a second embodiment of the present invention is shown in FIGS. 8 and 9. FIG. 9 shows the image stabilizing unit 61 of FIG. 8 seen from the direction of arrow A.

The image stabilizing unit 61 has a first retainer board 64 that can slide in the direction of arrow R along a first guiding shaft 63 provided on a base member 62, and a second retainer board 66 that can slide in the direction of arrow S along a second guiding shaft 65 provided on the first retainer board 64, with a compensation lens 67 which is a movable compensation member for determining an image forming position being retained onto the second retainer board 65. The image stabilizing unit 61 also has a first auxiliary spindle 68 which prevents rotation of the first retainer board 64 around the first guiding shaft 63, and a second auxiliary spindle 69 which prevents rotation of the second retainer board 64 around the second guiding shaft 65. The Image stabilizing unit 61 further has a first drive unit 70 for moving the second retainer board 66 together with the first retainer board 64 with respect to the base member 62 in the direction of arrow R, and a first drive unit 71 for moving the second retainer board 66 with respect to the base member 62 in the direction of arrow S.

The first drive unit 70 and the second drive unit 71 are voice coil motors, and a coil 73 is formed on a substrate 72 attached to the second retainer board 66 with a metallic pattern, the coil 73 being surrounded with a magnetic field formed by a magnet 75 and a yoke 77 retained on a retaining member 74 which is fixed to the base member 62. The magnet 75 is divided into the N pole and the S pole in the shorter side direction, and generates the driving torque for moving the substrate 72 through attraction/repulsion with the magnetic flux generated by sending current through the coil 73. Also a hall device 77 is placed on the substrate 72, so that by detecting change of magnetic flux, the position of the substrate 72 relative to the magnet 75 can be detected.

The first drive unit 70 and the second drive unit 71 are placed so that the centers of the coils 73 align on the straight line orthogonal to the optical axis Z. Although the substrate 72 is displaced in the direction orthogonal to its own drive direction by the drive operation of the first drive unit 70 and the second drive unit 71, the displacement amount thereof is slight, and therefore it can be said that the center of the coils 73 are constantly on the straight line which orthogonal to the optical axis Z. Each magnet 75 in the first drive unit 70 and the second drive unit 71 has sufficient length with respect to the coil 73 and the hall device 77 in the direction orthogonal to each drive direction, so that it becomes possible to prevent change of driving force from changing and error in detection position from being generated due to each drive operation.

In the above-structured image stabilizing unit 61, the first guiding shaft 63, the second guiding shaft 65 as well as the coils 73 serving as a driving source of the first drive unit 70 and the second drive unit 71 are respectively placed symmetrically on both sides of the compensation lens 67 so that their drive directions (R, S directions) are inclined 45 degrees with respect to the direction X from the coil 73 to the optical axis Z. Thus, the first guiding shaft 63 and the second guiding shaft 65 different in direction for 90 degrees from each other are respectively placed side by side in the long side direction (direction X) of the base member 62 in the state of being inclined 45 degrees with respect to the long side direction, so that the length occupied by the first guiding shaft 63 and the second guiding shaft 65 in the shorter side direction (direction Y) of the base member 62 can be minimized. In this case, the length occupied by the first guiding shaft 63 and the second guiding shaft 65 in the long side direction (direction X) of the base member 62 is exactly half the length occupied in the shorter side direction. In the image stabilizing unit 61, the compensation lens 67 as well as the first guiding shaft 63 and the second guiding shaft 65 are juxtaposed in the direction X, so that the base member 62 has the long side twice as long as the shorter side.

The first guiding shaft 63 and the second guiding shaft 65 have sufficient length respectively so that the compensation lens 67 can be guided smoothly. However, since the drive stroke of the first drive unit 70 and the second drive unit 71 is considerably short, the first guiding shaft 63 and the second guiding shaft 65 may be shortened by dividing the first guiding shaft 63 and the second guiding shaft 65 so that only an effective portion is left.

Figure 10:
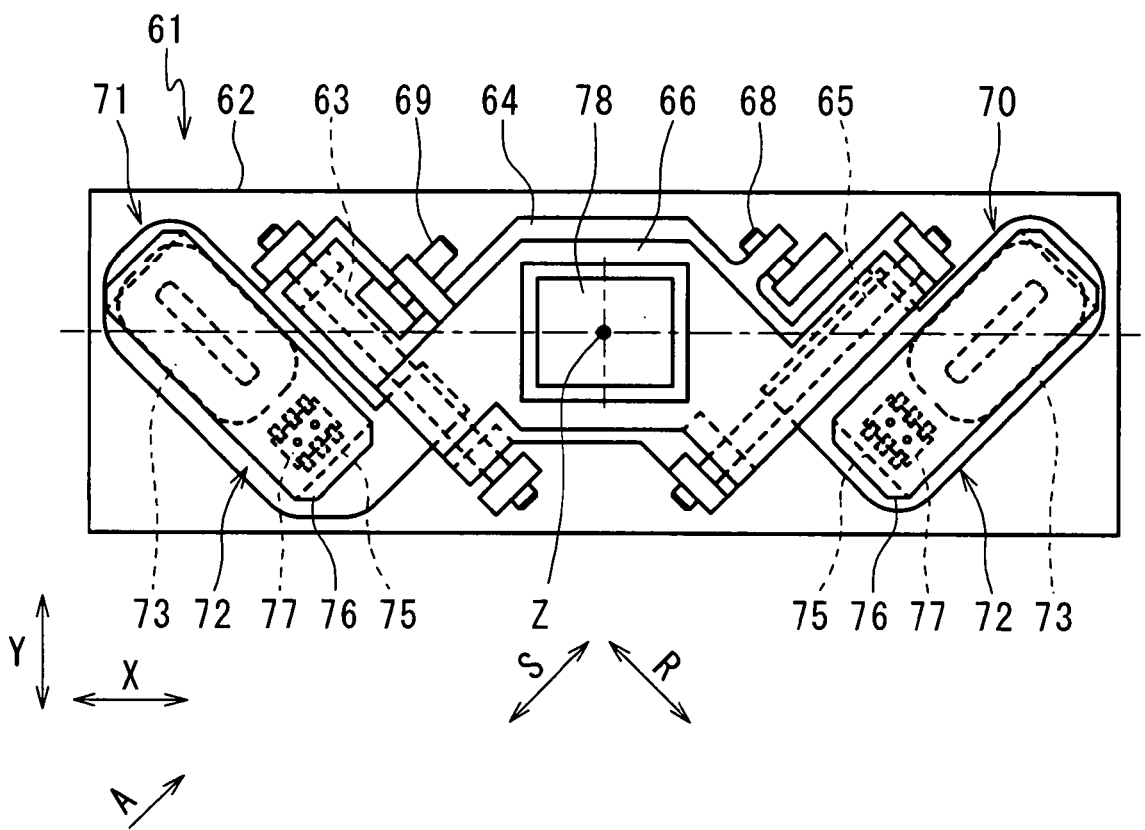
FIG. 10 is a plan view of an image stabilizing unit in a third embodiment of the present invention.

Although an image shake is compensated in the first and the second embodiment by displacing the compensation lenses 5 and 67 as a movable compensation member in the direction RS, an imaging device 78 like CCD may be mounted as a movable compensation member in place of the compensation lenses 5 and 67 as in the third embodiment shown in FIG. 10, and the imaging device 78 may be displaced in the direction of RS. Since the structure of this embodiment is the same as the second embodiment except for the imaging device 78, like component members are designated by like reference numerals to omit description.

In the present invention, as shown in the present embodiment, not only the absolute position of image formation is moved by using the compensation lenses 5 and 67 which constitute a part of the optical system for forming an image with the luminous flux incident from the subject, but also an image forming position can be moved relatively by displacing the imaging device 78 which converts a formed image into an electrical signal.

Although in the first through third embodiment, the balance of driving force is enhanced by placing two drive units with a movable compensation member interposed therebetween, the image stabilizing unit may be made flat by juxtaposing two drive units in one side of the movable compensation member.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image stabilizing unit, comprising:
a base member in which a long side of the base member is at least twice as large as a shorter side of the base member in a direction perpendicular to an optical axis;
a movable compensation member which can displace an image forming position by moving in a plane perpendicular to the optical axis; and
two drive units which respectively move the movable compensation member in different directions, wherein the different directions in which the two drive units respectively move the movable compensation member are inclined to a direction which connects the two drive units and an optical axis center of the movable compensation member and are respectively inclined to the long side of the base member.

2. The image stabilizing unit according to claim 1, wherein the different directions in which the two drive units respectively move the movable compensation member are inclined approximately 45 degrees with respect to a direction which connects the two drive units and an optical axis center of the movable compensation member.

3. The image stabilizing unit according to claim 1, wherein the two drive units are placed on both sides of the movable compensation member across the optical axis.

4. The image stabilizing unit according to claim 1, wherein the two drive units are placed on a straight line which crosses the optical axis at right angles.

5. The image stabilizing unit according to claim 1, wherein each of the two drive units comprises:
   an electromechanical transducer expanding and contracting in response to applied voltage;
   a drive friction member, one end of which is fixed to the electromechanical transducer and which reciprocates by expansion and contraction of the electromechanical transducer; and
   a movable body which engages with the drive friction member by frictional force.

6. The image stabilizing unit according to claim 1, wherein the drive units are constituted of voice coil motors.

7. The image stabilizing unit according to claim 1, wherein the movable compensation member includes a lens.

8. The image stabilizing unit according to claim 1, wherein the movable compensation member includes an imaging device.

9. The image stabilizing unit according to claim 1, wherein one of the two drive units comprises an electromechanical transducer that reciprocates in one of the different directions by expansion and contraction.

10. The image stabilizing unit according to claim 1, wherein centers of masses of the two drive units are present on the direction which connects the two drive units and the optical axis center.

11. The image stabilizing unit according to claim 1, further comprising a hall sensor to measure displacement of the movable compensation member.

12. The image stabilizing unit according to claim 1, wherein the base member has a shape of a rectangular plate.

13. An image stabilizing unit, comprising:
   a base member in which a long side of the base member is at least twice as large as a shorter side of the base member in a direction perpendicular to an optical axis;
   a movable compensation member which is supported movably in a plane perpendicular to the optical axis along two directions different from each other and can displace an image forming position by moving; and
   two drive units which respectively move the movable compensation member along either of the two directions, wherein the base member forms a flat shape in which a long side is twice as large as a shorter side in a direction perpendicular to the optical axis or larger, and wherein the two drive units are respectively placed on both sides of the movable compensation member in a long side direction of the base member across the optical axis and wherein each of the two directions are inclined to the long side of the base member.

14. The image stabilizing unit according to claim 13, wherein each of the two directions are inclined approximately 45 degrees to the long side direction of the base member.

15. The image stabilizing unit according to claim 13, wherein the two drive units are placed on a straight line which crosses the optical axis at right angles.

16. The image stabilizing unit according to claim 13, wherein each of the two drive units comprises:
   an electromechanical transducer expanding and contracting in response to applied voltage;
   a drive friction member, one end of which is fixed to the electromechanical transducer and which reciprocates by expansion and contraction of the electromechanical transducer; and
   a movable body which engages with the drive friction member by frictional force.

17. The image stabilizing unit according to claim 13, wherein the drive units are constituted of voice coil motors.

18. The image stabilizing unit according to claim 13, wherein the movable compensation member includes a lens.

19. The image stabilizing unit according to claim 13, wherein the movable compensation member includes an imaging device.

20. The image stabilizing unit according to claim 13, wherein one of the two drive units comprises an electromechanical transducer that reciprocates in a direction by expansion and contraction.

21. The image stabilizing unit according to claim 15, wherein centers of masses of the two drive units are present on the straight line.

22. The image stabilizing unit according to claim 13, further comprising a hall sensor to measure displacement of the movable compensation member.

23. The image stabilizing unit according to claim 13, wherein the base member has a shape of a rectangular plate.

24. A lens unit, comprising:
   an optical system which forms an image with luminous flux incident from a subject; and
   an imaging device for receiving the luminous flux with which the optical system formed the image and for converting the luminous flux into an electrical signal;
   an image stabilizing unit for stabilizing a position of the image on the imaging device, the imaging stabilizing unit comprising:
      a base member in which a long side of the base member is at least twice as large as a shorter side of the base member in a direction perpendicular to an optical axis;
      a movable compensation member disposed on the base member which can displace an image forming position by moving in a plane perpendicular to an optical axis; and
      two drive units disposed on the base member and which respectively move the movable compensation member in different directions, wherein the different directions in which the two drive units respectively move the movable compensation member are inclined to a direction which connects the two drive units and an optical axis center of the movable compensation member.

25. The lens unit according to claim 24, wherein one of the two drive units comprises an electromechanical transducer that reciprocates in one of the different directions by expansion and contraction.

26. The lens unit according to claim 24, wherein centers of masses of the two drive units are present on the direction which connects the two drive units and the optical axis center.

27. The lens unit according to claim 24, further comprising a hall sensor to measure displacement of the movable compensation member.

28. An imaging apparatus comprising:
   a main body with a lens opening;
   a lens unit that faces the lens opening, the lens unit comprising:

an optical system which forms an image with luminous flux incident from a subject; and an imaging device for receiving the luminous flux with which the optical system formed an image and for converting the luminous flux into an electrical signal, said imaging device comprising an image stabilizing unit, the imaging stabilizing unit comprises:

a base member;

a movable compensation member disposed on said base member which can displace an image forming position by moving in a plane perpendicular to an optical axis; and two drive units disposed on the base member and which respectively move the movable compensation member in different directions, wherein the different directions in which the two drive units respectively move the movable compensation member are inclined to a direction which connects the two drive units and an optical axis center of the movable compensation member.

29. The image apparatus according to claim 28, wherein one of the two drive units comprises an electromechanical transducer that reciprocates in one of the different directions by expansion and contraction.

30. The image apparatus according to claim 28, wherein centers of masses of the two drive units are present on the direction which connects the two drive units and the optical axis center.

31. The image apparatus according to claim 28, further comprising a hall sensor to measure displacement of the movable compensation member.

32. The lens unit according to claim 24, comprising an optical member which bends luminous flux incident from a subject at an approximately right angle, wherein the image stabilizing unit is placed closer to an image forming side than the optical member.

33. An imaging apparatus comprising:

a main body with a lens opening;

a lens unit that faces the lens opening, the lens unit comprising:

an optical system which forms an image with luminous flux incident from a subject; and an imaging device for receiving the luminous flux with which the optical system formed the image and for converting the luminous flux into an electrical signal;

an image stabilizing unit for stabilizing a position of the image on the imaging device, the imaging stabilizing unit comprising:

a base member in which a long side of the base member is at least twice as large as a shorter side of the base member in a direction perpendicular to an optical axis;

a movable compensation member disposed on the base member which can displace an image forming position by moving in a plane perpendicular to an optical axis; and two drive units disposed on the base member and which respectively move the movable compensation member in different directions, wherein the different directions in which the two drive units respectively move the movable compensation member are inclined to a direction which connects the two drive units and an optical axis center of the movable compensation member; and wherein a direction where a size of the base member is shortest is congruous with a thickness direction of the imaging apparatus.

34. The image apparatus according to claim 33, wherein one of the two drive units comprises an electromechanical transducer that reciprocates in one of the different directions by expansion and contraction.

35. The image apparatus according to claim 33, wherein centers of masses of the two drive units are present on the direction which connects the two drive units and the optical axis center.

36. The image apparatus according to claim 33, further comprising a hall sensor to measure displacement of the movable compensation member.

* * * * *